United States Patent [19]
Kurup et al.

[11] Patent Number: 5,618,491
[45] Date of Patent: Apr. 8, 1997

[54] STUDS FOR BOILERS AND OTHER HIGH TEMPERATURE APPLICATIONS

[75] Inventors: Mohan Kurup, Richmond Hts.; Clark Champney, Elyria, both of Ohio

[73] Assignee: TRW, Inc., Lyndhurst, Ohio

[21] Appl. No.: 605,372

[22] Filed: Feb. 22, 1996

[51] Int. Cl.$^6$ .......................... C22C 38/06; B23K 11/00; F23M 5/00; F22B 7/00
[52] U.S. Cl. .................. 420/77; 420/79; 420/81; 148/320; 148/334; 148/333; 219/98; 219/99; 260/282; 110/336
[58] Field of Search .................. 420/77, 79, 81; 148/320, 334, 333; 219/98, 99; 266/282; 110/336

[56] References Cited

U.S. PATENT DOCUMENTS

| | | |
|---|---|---|
| 2,172,023 | 9/1939 | Gat . |
| 2,768,915 | 10/1956 | Nachman et al. . |
| 2,883,215 | 4/1959 | Jenkins . |
| 2,960,401 | 11/1960 | Buehler et al. . |
| 3,184,577 | 5/1965 | Witherell . |
| 3,336,712 | 8/1967 | Bartley . |
| 3,339,799 | 9/1967 | Spisak . |
| 3,760,143 | 9/1973 | Rondeau et al. .......................... 219/98 |
| 3,973,918 | 8/1976 | Tidwell . |
| 4,684,304 | 8/1987 | Franks ........................ 411/171 |
| 4,684,505 | 8/1987 | Brinegar et al. . |
| 4,959,518 | 9/1990 | Reynolds, Jr. ........................ 219/99 |
| 4,961,903 | 10/1990 | McKamey et al. . |
| 5,084,109 | 1/1992 | Sikka . |
| 5,173,254 | 12/1992 | Amano et al. . |
| 5,328,527 | 7/1994 | Kurup et al. . |

FOREIGN PATENT DOCUMENTS

| | | | |
|---|---|---|---|
| 648141 | 9/1962 | Canada ................................ 420/79 |
| 2137343 | 2/1973 | Germany ............................. 420/78 |

*Primary Examiner*—Deborah Yee
*Attorney, Agent, or Firm*—Tarolli, Sundheim, Covell, Tummino & Szabo

[57] ABSTRACT

Disclosed is a stud for a boiler or other high temperature application, such as a furnace. The stud is made of an iron aluminum alloy which comprises about 81 to 91 wt. % iron, about 8 to 13 wt. % aluminum, about 0.01 to 0.3 wt. % carbon, and zero to about 3 wt. % of a refractory metal and/or zero to about 1.5 wt. % zirconium. The studs are welded to a surface of a component of the boiler or furnace by arc or resistance welding. The aluminum of the iron aluminum alloy imparts good oxidation and sulfidation resistance to the studs. The alloy also has a good electrical resistance which makes the alloy especially useful for arc or resistance welding. The aluminum content acts as a getter to eliminate gas porosity in the resulting welds. The present invention is particularly useful for making boiler heat exchange surfaces or refractory covered surfaces wherein the studs function as refractory anchors.

29 Claims, 5 Drawing Sheets

STUDS FOR BOILERS AND OTHER HIGH TEMPERATURE APPLICATIONS

BACKGROUND OF THE INVENTION

1. Technical Field

The present invention relates to studs for use in high temperature applications such as boilers and furnaces. The studs are made of an iron aluminum alloy. They are welded to surfaces of the boilers or furnaces and provide additional heat transfer area or anchor refractory material to the surfaces.

2. Description of the Prior Art

Furnaces and boilers having studded surfaces may be fueled by a variety of fuels such as coal, petroleum and natural gas. Studs are also used in such furnaces or boilers as waste heat boilers, solid waste incinerators, and paper mill tar boilers.

Many components of these furnaces or boilers, such as heat exchanger tubes, have surfaces which are exposed to high temperatures and corrosive conditions. Resistance to the high temperatures and corrosive conditions is of great importance.

The studs are small metal projections which are welded onto the surfaces in a closely spaced pattern. The studs can have a variety of configurations. On a heat exchange surface, the studs provide additional surface area for heat transfer. They can also protect the surface from direct exposure to combustion heat and by-products which reduce the life of the furnace component. They can also protect the surface from abrasion caused by the motion of slag, carbon particles, or particulates present in the combustion gases. On a refractory covered surface, the studs function primarily as anchors for the refractory material.

The studs used presently in furnace applications have a mild steel, stainless steel or nickel based composition. Mild steel studs have been widely used for low temperature applications. For high temperatures and corrosive conditions, stainless steel alloys and nickel based alloys are used. The most commonly used stainless steel grade of ferritic alloy is SS430. Ferritic stainless steels have increased heat and scale resistance due to their chromium content of 11 to 18 weight percent. Another class of stainless steels which is used are the austenitic alloys such as 304, 305, 309, 310, 316, 316L, 321 and 348. These stainless steels typically have 17 to 26 weight percent chromium and 8 to 22 weight percent nickel.

For ultimate temperature performance, studs made from nickel based superalloys like INCONEL are used. These alloys can have nickel in the range of 40 to 70 weight percent and chromium in the range of 15 to 48 weight percent. Costly alloying elements like nickel and chromium in both the stainless and nickel based superalloys increase the cost of the raw material.

The studs are usually welded to the surface of a furnace component by either stud arc welding or resistance welding. In both of these procedures, the studs are one of the electrodes in the welding step.

The strength of the resulting weld is a good indicator of the weld quality which is an important factor in determining stud life in service. Even though some studs presently used may be considered to be essentially sacrificial in nature, the replacement of studs is expensive and time-consuming and can require substantial down-time for the installation involved. It is therefore desirable to have as high a weld strength as possible, in order to achieve the longest stud life.

To achieve optimum weld strength, it is necessary to provide a flux which during the weld cycle will function as a getter to absorb gases generated by the weld process. The flux inhibits the formation of voids in the finished welds.

In the stud welding process, the most frequently used flux is aluminum. Aluminum in the molten state is an excellent absorber of gases and at the same time has melting and freezing points which permit its use in the welding of iron and nickel based materials.

U.S. Pat. No. 2,883,215 discloses a steel stud provided with an aluminum flux. The stud is formed with a frustoconical end. The end has a flat surface, a hole in the flat surface, and an aluminum flux ball fitted into the hole.

The stud may also be aluminum fluxed by coating aluminum on the surface of the stud, or by positioning powder aluminum in a cap on the end of the stud.

SUMMARY OF THE INVENTION

The present invention resides in a stud for welding to surfaces exposed to high temperatures. The stud has an iron aluminum alloy composition comprising about 8 to about 13 wt. % aluminum and about 0.01 to about 0.3 wt. % carbon. The iron aluminum alloy composition preferably also has up to about 3 wt. % of a refractory metal, up to about 1.5 wt. % zirconium, and up to about 1 wt. % chromium. Preferred refractory metals are titanium, molybdenum, vanadium, niobium, tungsten and tantalum.

It was found that by making the stud of an iron aluminum alloy composition, which comprised at least 8 wt. % aluminum, there is made available during the welding process sufficient aluminum at the weld point to flux the weld joint and in turn obtain good weld strength that exceeds industry acceptance levels. By the present invention, the normal flux loading of the studs can be eliminated from the stud manufacturing process. This offers a cost saving without adverse effect on the weld quality.

At the same time, the 8 wt. % or more aluminum in the stud composition provides a stud resistance to oxidation and sulfidation under high temperature furnace conditions which is considerably greater, to a surprising extent, than that achieved with conventional stud materials. The studs have approximately zero weight percent loss after being heated in air at 2,000° F. for 100 hours.

The iron aluminum alloy of the present invention with about 8 to 13 wt. % aluminum was found to have good ductility, as evidenced by percent elongation and percent reduction in area data obtained on the alloy, permitting fabrication of the alloy into various stud shapes by conventional manufacturing methods. These methods include shearing, cold heading, turning, bending and forming.

The aluminum content of at least 8 wt. % provides increased electrical resistivity which is useful in both stud arc welding and electric resistance welding, wherein the stud is an electrode during the welding process.

The present invention also resides in the combination which comprises a furnace component, a surface of said component exposed to high temperature conditions, and a plurality of studs welded to said surface, said studs having an iron aluminum alloy composition which comprises about 8 to about 13 wt. % aluminum, and about 0.01 to about 0.3 wt. % carbon.

The present invention also resides in a method for manufacturing a furnace component which comprises the steps of: providing a surface resistant to furnace conditions; providing a plurality of studs; welding said studs to said surface in a predetermined pattern by arc or resistance welding, wherein the studs function as an electrode in the welding step; the studs having an iron aluminum alloy composition comprising about 8 wt. % to about 13 wt. % aluminum and about 0.01 to about 0.3 wt. % carbon.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

In the present application, composition percentages are weight percents based on the total composition weight, unless otherwise specified.

For purposes of the present application, the term "furnace component" means any component exposed to combustion conditions. Examples of installations comprising a furnace component in which the present invention is useful are heaters, furnaces, boilers, kilns, refineries, smelters, caster molds, pressure vessels, distillation towers, waste heat boilers, petroleum processing plants, paper mill tar boilers, and solid waste incinerators. Examples of specific components in such installations with which the present invention is useful are refractory covered surfaces, heat exchange surfaces, and boiler components such as boiler tubes and headers which may or may not be covered with refractory material.

Such surfaces can be located in the combustion area of a furnace, or in a location remote from the furnace, such as a bag house, header or chimney. In either event, the surfaces are commonly exposed to severe temperature conditions, chemical attack, abrasion and mechanical abuse. The term "furnace component" includes all such locations.

The studs of the present invention are small metal projections which are welded to surfaces of the furnace components. The studs can have a variety of configurations. One suitable configuration is shown in FIG. 1 for welding onto a boiler or heat exchange surface.

Figure 1:
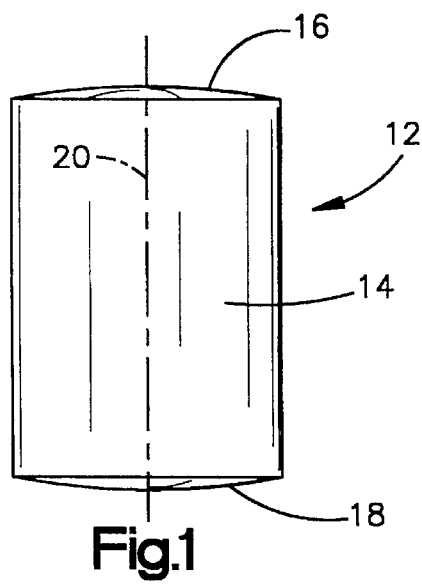
FIG. 1 is an elevation view of a stud according to the present invention showing one example of a stud configuration.

Referring to FIG. 1, the stud 12 has a relatively straight body 14 and slightly domed or crowned weld ends 16 and 18. The dome angle at the weld ends 16, 18 is about 4° to 7° with respect to a plane at right angles to the axis 20 of the body 14. The angle is exaggerated in FIG. 1 for purposes of illustration.

The stud 12 in FIG. 1 has a cylindrical cross-section. However, the cross-section can be rectangular or have some other shape.

The primary method of welding the stud 12 to a surface is the stud welding process. This is a machine controlled arc welding process. Stud welding is done with a rectifier or generator power source. A ceramic ferrule is usually placed around the weld end of the stud to contain the molten metal. Stud welds may be made without the use of a ceramic ferrule, but a ceramic ferrule is desirable to achieve better weld quality and weld strength.

An example of a stud welding gun suitable for the stud welding process is disclosed in U.S. Pat. No. 3,339,779.

During the stud welding process, the stud 12 is loaded into the chuck of the stud gun manually or automatically from a magazine containing a plurality of studs. A ferrule is also loaded into the ferrule holder on the front of the stud gun. The stud 12 extends slightly beyond the bottom of the ferrule to compensate for metal burned off during the welding and to allow the stud 12 to be plunged into the molten metal. The gun is placed against the furnace component surface to be studded. The stud 12 is pushed back flush with the ferrule, compressing the main spring of the gun. When the gun's trigger is pressed to initiate the weld current, a solenoid within the gun is energized to retract the stud 12, striking the arc. The stud 12 acts as an electrode and the electric arc between it and the workpiece generates sufficient heat to melt both the surface being studded and the tip of the stud 12. At the end of the weld cycle, the solenoid is de-energized and the stud 12 plunges into the molten metal at the proper time to complete the weld process. The ceramic ferrule acts as a shield and mold around the stud base to contain and form a weld flash, to prevent the loss of molten metal, and to prevent splatter. The stud weld gun is then removed from the welded stud and the ferrule is removed. The entire operation for welding the stud 12 can be completed in less than a second.

The stud 12 in FIG. 1 is referred to as "unipolar". This means that it is symmetrical at ends 16, 18 and can be loaded into the stud welding gun in either direction, that is, with either end 16, 18 facing the surface to which the stud is welded. The stud 12 in FIG. 1 is typically used for stud welding directly to a boiler tube.

The doming of weld ends 16, 18 (FIG. 1) provides an initial point of contact, between the stud 12 and the surface to which the stud is welded, which is in the center of each weld end. This assures that the weld arc initiates from the center of the weld end 16 or 18 rather than an edge of the stud, in turn achieving a more uniform weld joint.

Other arc welding procedures can be used to install stud 12. Examples of these are shielded metal-arc welding, gas metal arc welding, and hand arc welding. An inert gas can be used such as in tungsten inert gas (TIG) welding and metal inert gas (MIG) welding.

The stud welding procedure and other arc welding procedures have the common feature that fusion is produced by heating with an electric arc.

The welding of the stud 12 can also be accomplished by resistance welding. Resistance welding is distinguishable from arc welding in that fusion is produced by the heat obtained from the resistance offered by the work to the flow of electric current and by the application of pressure.

Other welding procedures known to those skilled in the art can also be used.

In a boiler or on a heat exchange surface, a plurality of the studs 12 function to provide additional heat transfer surface. On such surface, the studs 12 can also function to extend the life of the surface by protecting the surface from direct exposure to combustion heat and from abrasive by-products in the combustion gases, such as carbon particles, slag, and other particulates.

The manufacture of the stud 12 is typically a cold heading process. A coil or bar stock is provided. The coil or bar stock is passed through a straightener and then to a cold forming machine. In the cold forming machine, the coil or bar stock is cut or sheared to pieces of desired length. The cut or sheared pieces are then cold headed at one or both ends. As in any heading process, metal is moved in the heading step to achieve the desired end shape, which in the case of FIG. 1 is a domed or crowned shape.

A critical aspect of the present invention is the composition of the stud 12.

The stud 12 has an iron aluminum alloy composition in which at least about 8% aluminum is present. At about 8% aluminum, sufficient aluminum is present at the weld point to flux the weld joint. The flux is necessary to meet weld strength specifications. At about 8% aluminum, the studs also have surprisingly good oxidation and sulfidation resistance to corrosive and high temperature conditions in furnace applications. At less than about 8% aluminum, there is insufficient aluminum to provide good oxidation and sulfidation resistance.

Preferably, the composition of the present invention has less than about 13% aluminum. At more than about 13% aluminum, the aluminum tends to embrittle the alloy. This in turn increases the susceptibility of the iron aluminum alloy stud to environmental and thermally induced cracking during forming using conventional forming procedures. Also, at more than about 13 percent aluminum, the stud 12 can have a relatively low yield strength. Even though the stud as a general rule is not considered to be load bearing, such properties as tensile strength and yield strength can be important in optimizing stud life. If a stud becomes severely eroded, the tensile strength and yield strength have to be sufficient to compensate for the reduced amount of metal present.

Also, in the range of 8% to 13% aluminum, the iron aluminum alloy of the present invention advantageously has increased electrical resistivity, compared to traditional mild steel, stainless steel or INCONEL materials. The higher resistivity means that lower current densities can be employed in the stud welding process, less amperage and/or time is required to effect the weld joint, and less care need be exercised to avoid weld distortion.

A preferred range for the aluminum is about 9% to about 12.5%.

Carbon is present in the iron aluminum alloy in the range of 0.01% to 0.3%. The carbon forms precipitates which are uniformly dispersed through the iron aluminum mass. The precipitates improve high temperature strength by retarding recrystallization and by controlling unusual grain growth. At more than about 0.3% carbon, forming capability of the alloy drops making it more difficult to form the alloys into a stud using normal stud forming procedures.

The composition of the present invention also preferably contains a refractory metal such as titanium, molybdenum, vanadium, niobium, tungsten and tantalum. At least about 0.5% refractory metal is desirable. A preferred upper limit for the refractory metal is about 3%. For instance, the presence of free vanadium can reduce ductility of the iron aluminum alloy and its formability. Similarly, molybdenum, in the absence of sufficient reactive carbon, can cause embrittlement of the iron aluminum alloy.

Zirconium and chromium may also be provided in the alloy of the present invention. These components provide additional oxidation and sulfidation resistance. However, chromium is expensive and only small amounts of chromium are used, less than about 3%, preferably less than about 1%. Up to 1.5 percent zirconium can be used in combination with the carbon. At least about 0.2% is desirable. The zirconium forms precipitates with the carbon throughout the matrix of the composition providing improved grain structure. The zirconium can be present with the refractory metal or as an alternative to the refractory metal.

The compositions of the present invention can also comprise additional elements, such as up to 1% by weight manganese and up to 0.8 weight percent silicon. These are generally considered to be trace elements and by-products from the use of commercial steels as a raw materials for the iron aluminum alloys of the present invention.

The balance of the composition preferably is iron, preferably about 81% to about 91% iron.

An important feature of the present invention is that the iron aluminum alloys are free of large amounts of the costly elements such as nickel and chromium, thus creating a substantial cost savings in the cost of the studs of the present invention over studs made from materials of the prior art.

Figure 2:
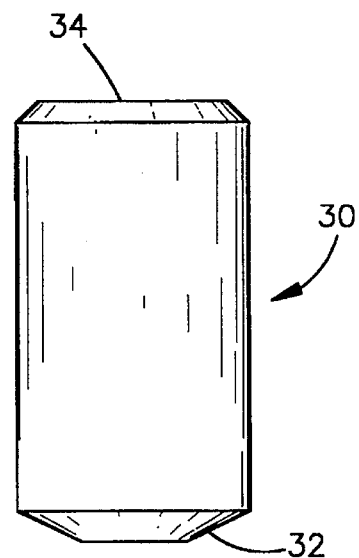
FIGS. 2, 3 and 4 are elevation view of studs according to the present invention illustrating alternative stud configurations.

In FIG. 2 an alternative stud configuration is illustrated. In this illustration, the stud 30 has an asymmetric configuration comprising one end 32 which is frustoconical, and an opposite end 34 which is generally flat. The stud 30 is similar in every respect, including composition, to the stud 12 of FIG. 1 except for the asymmetric configuration. As with the stud 12 of FIG. 1, the stud 30 preferably is welded to a surface using the stud welding procedure. The stud 30 also is typically used for stud welding directly to a boiler tube. Because of the asymmetric configuration, however, the stud 30 is loaded into a stud welding gun in only one direction with the end 32 facing the surface to which the stud 30 is to be welded.

The stud 30 is made using the same cold heading and machining procedure used to make stud 12 of FIG. 1.

Figure 3:
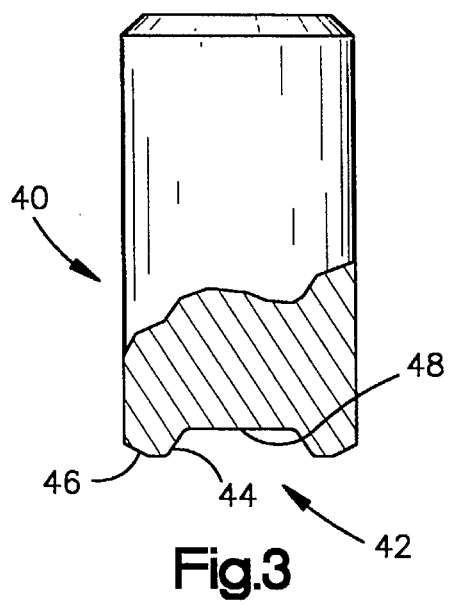

Another alternative stud configuration is illustrated in FIG. 3. In FIG. 3, the stud 40 has a concave end 42 which is truncated. The end 42 comprises surface 44 between an outer edge 46 and an inner flattened portion 48.

The stud 40 is made by cold heading the end 42 similar to manufacture of the stud 12 of FIG. 2. The concave surfaces 44 and 48 are formed in the cold heading step in addition to edge 46. The stud 40 with concave weld end 42 is useful in stud welding to the ends of studs previously installed on a boiler tube.

As with the stud 12 of FIG. 1, the stud 40 has an end configuration by which the welds are initiated from a confined area producing a more uniform weld joint.

Figure 4:
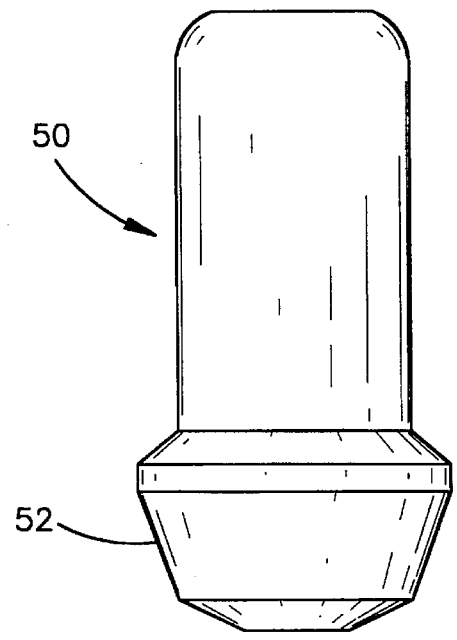

In FIG. 4, the stud 50 has a mushroom head 52. The mushroom head 52 provides additional heat transfer surface when the stud 50 is welded to a furnace component surface. This stud configuration also provides a confined area from which the weld arc initiates. The stud 50 of FIG. 4 is designed for resistance welding.

The studs 40 and 50 are similar in every respect, including composition, to the stud 12 of FIG. 1, and are used in the same way. The stud 50 is made by the same cold heading and machining procedure used to make the stud 12.

When used as refractory anchors, the studs have a refractory anchor configuration. This means that the studs have a shank portion which projects into the refractory material, usually at essentially a right angle to the plane of the refractory material, and one or more arm portions which may be more or less in the same plane as the refractory material. The arm portions serve to retain the refractory material on the furnace surface involved. The arms can be embedded in the refractory material or can be on the exposed surface of the refractory material, depending in part on how the refractory material is applied.

FIG. 5 illustrates a variety of configurations useful for anchoring refractory material to a surface. The studs can be "Y"-shaped as shown in FIG. 5A, or more "V"-shaped as shown in FIG. 5B. They can be "L"-shaped as shown in FIG. 5C, slotted as shown in FIG. 5D, or tined as shown in FIGS. 5E through 5I. They can be waved as shown in FIGS. 5F through 5I. They can also be threaded. Other configurations are known or will be apparent to those skilled in the art.

As with the studs of FIGS. 1 through 4, the studs of FIG. 5 can be welded to a surface using the stud welding procedure. Usually, however, they are manually fed into the chuck of a stud welding gun. Some refractory anchors are more conveniently hand welded to a surface.

Usually, the refractory anchors of FIG. 5 are made from a wire or strip stock material. They are made by shearing, cutting, slitting, bending and cold stamping steps.

The studs of FIG. 5 have the same iron aluminum alloy composition as those of FIGS. 1 through 4.

On a refractory covered surface, the studs provide anchorage for the refractory material. The refractory materials may be plastic or castable refractory which can be cast, trowled, rammed, pumped, or gunned onto studded surfaces. The refractory may also be bricks, modules or blankets. The present invention has applicability with all such refractory linings or coatings.

Figure 5A:
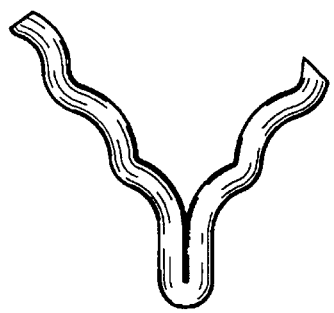
FIGS. 5(A) to 5(K) contain examples of additional stud configurations which are particularly useful for anchoring refractory material.
Figure 5B:
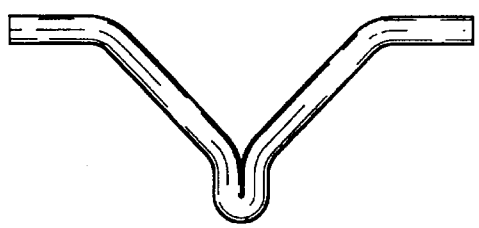
Figure 5C:
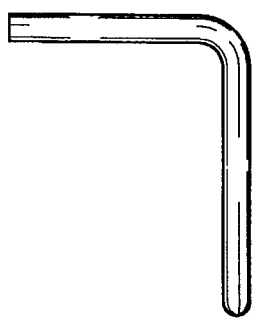
Figure 5D:
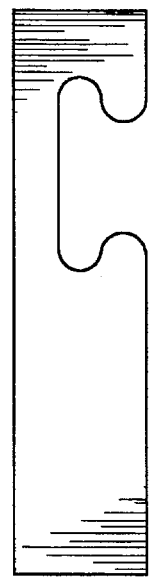
Figure 5E:
Figure 5F:
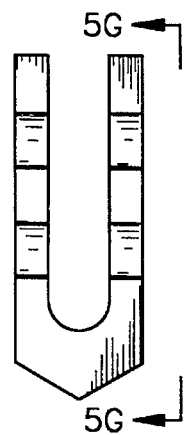
Figure 5G:
Figure 5H:
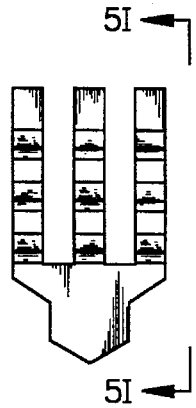
Figure 5I:
Figure 5J:
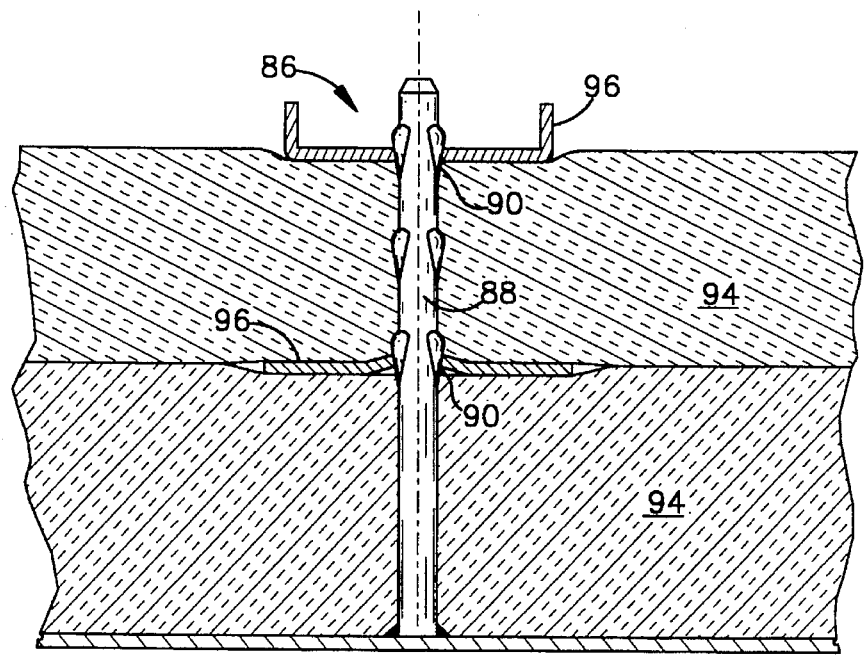
Figure 5K:
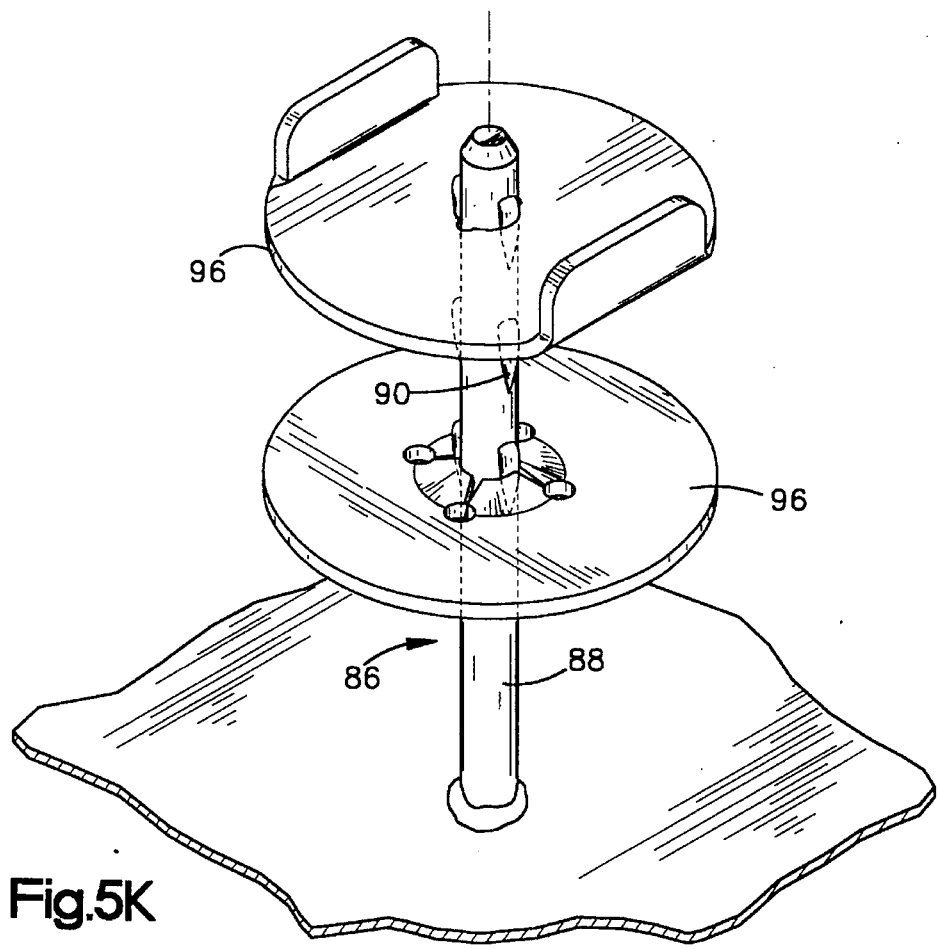

It will be understood by those skilled in the art that the studs of the present invention can have a multi-component configuration. In FIGS. 5J and 5K, a multi-component configuration (stud 86) is illustrated. The stud 86 comprises a shank member 88. The shank member 88 is notched at notches 90. The shank member 88 is welded to a surface 92, and penetrates blanket material 94. A pair of clips 96 engage notches 90 and hold the blanket material 94 to surface 92.

Figure 6:
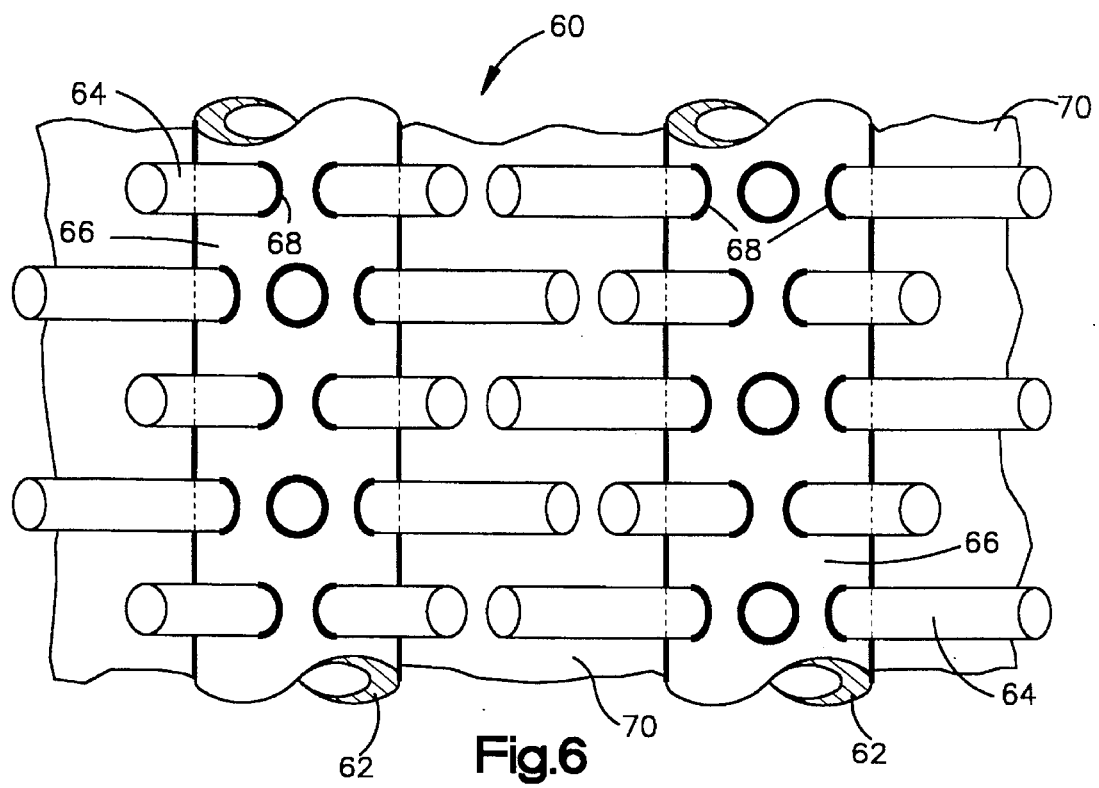
FIG. 6 is a plan view illustrating a studded furnace component in accordance with the present invention.
Figure 7:
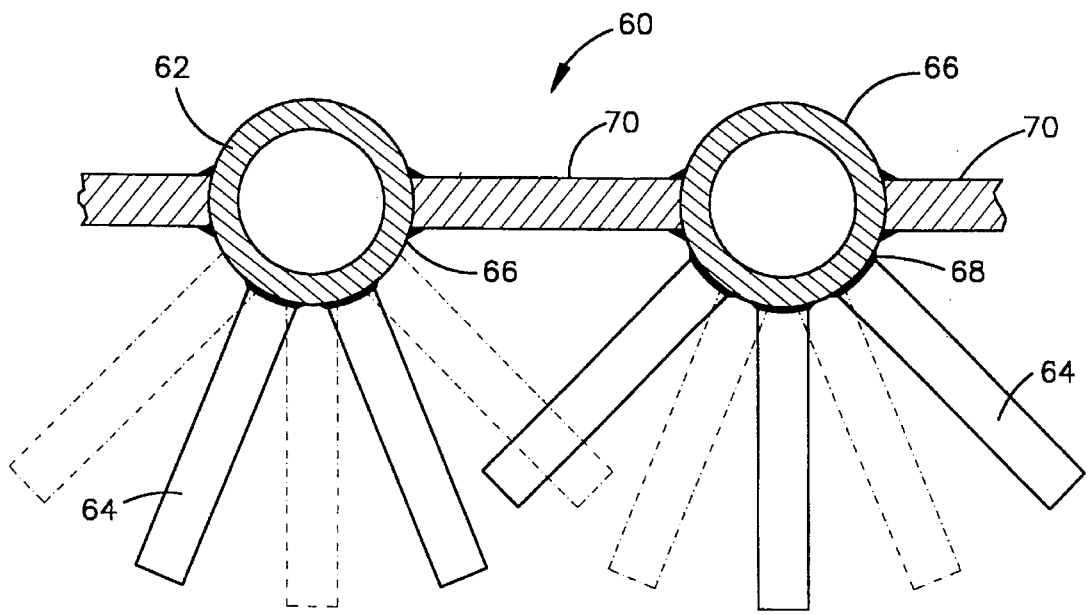
FIG. 7 is an end view of the furnace component of FIG. 6.

Referring to FIGS. 6 and 7, there is illustrated a furnace component 60 in accordance with the present invention. The furnace component 60 in the Figures comprises a plurality of boiler tubes 62 spaced apart by membranes 70. The studs 64 are welded to the surfaces 66 of the boiler tubes 62 by welds 68. The studs 64 are spaced apart on the surfaces 66 in a predetermined pattern, which in FIGS. 6 and 7 is staggered. Customarily, the studs are on ¾ inch centers. Typically, they are about ⅜ to about ½ inch in diameter (e.g., width), and about ⅝ inch to 2⅛ inches in length.

The studs 64 can have any of the configurations of FIGS. 1–4 or other configurations as well known in the art.

Normally, the refractory anchor studs of FIG. 5 will be welded to a flat surface, and will be spaced further apart than shown in FIGS. 6 and 7.

The following Example illustrates the present invention.

EXAMPLE

A number of specimens having a straight, cylindrical, stud configuration similar to that of FIG. 1 and made from various iron aluminum alloy composition according to the present invention were prepared. The studs were ⅜ inch in diameter and ¾ inch in length. The compositions are shown in the following Table 1.

TABLE 1

| Element | ALLOYS (WEIGHT %) | | | |
| --- | --- | --- | --- | --- |
| | A95-1 | A95-5 | A95-6 | K4L |
| C | 0.015 | 0.017 | 0.25 | 0.22 |
| $N_2$ | 0.002 | 0.003 | 0.002 | — |
| Mn | 0.46 | 0.48 | 0.48 | 0.59 |
| Si | 0.16 | 0.17 | 0.16 | 0.20 |
| P | 0.014 | 0.02 | 0.02 | — |
| S | 0.01 | 0.012 | 0.01 | — |
| Al | 11.05 | 9.83 | 9.51 | 11.1 |
| Cr | 30.1 | 0.10 | 0.10 | 0.10 |
| Ni | 0.1 | 0.1 | 0.10 | 0.12 |
| Mo | 0.035 | 0.03 | 0.04 | 0.05 |
| Cu | 0.07 | 0.06 | 0.06 | 0.13 |
| Ti | 0.55 | 0.54 | 0.55 | — |
| Zr | 0.89 | 0.96 | 0.96 | 1.25 |
| Fe | Bal | Bal | Bal | Bal |

In addition, studs made of certain stainless steel and carbon steel alloys used to manufacture current commercially available studs were also prepared having the same configuration. The stainless steel and carbon steel alloys were SS316L, SS304, SS430, SS409, and SAE carbon steel 1015. Their compositions are shown in the following Table 2.

TABLE 2

| Element | Alloys (Weight %) | | | | |
| --- | --- | --- | --- | --- | --- |
| | SS 316L | SS 304 | SS 430 | SS 409 | SAE 1015 |
| C | 0.03 MAX | 0.08 MAX | 0.12 MAX | 0.08 MAX | 0.13–0.18 |
| Mn | 2.0 MAX | 2.0 MAX | 1.0 MAX | 1.0 MAX | 0.30–0.60 |
| Si | 1.0 MAX | 1.0 MAX | 1.0 MAX | 1.0 MAX | — |
| P | 0.05 MAX | 0.05 MAX | 0.05 MAX | 0.05 MAX | 0.04 MAX |
| S | 0.03 MAX | 0.03 MAX | 0.03 MAX | 0.03 MAX | 0.05 MAX |
| Cr | 16.0–18.0 | 18.0–20.0 | 14.0–18.0 | 10.5–11.7 | — |
| Ni | 10.0–14.0 | 8.0–12.0 | — | 0.5 MAX | — |
| Mo | 2–3 | — | — | — | — |
| Ti | — | — | — | 0.75 MAX | — |
| Fe | Bal | Bal | Bal | Bal | Bal |

The studs of the present invention had an electrical resistivity of about 112 micro-ohms per centimeter. The alloys of Table 2 had the resistivities shown in the following Table 3.

TABLE 3

| Alloy | Electrical Resistivity (micro-ohms centimeter) |
| --- | --- |
| SS 316L | 74 |
| SS 304 | 72 |
| SS 430 | 60 |
| SAE 1015 | 12 |

The electrical resistivities of the alloys in Table 3 were taken from the American Society of Metals Handbook. As can be seen, the electrical resistivities of the iron aluminum alloys of the present invention were roughly two or more times those of the alloys of Table 2. The higher electrical resistivities of the alloys of the present invention made it possible to employ lower current densities in the welding step, faster welding times, and less stringent parameters in other respects.

The studs of the present invention and those of the prior art were welded to a furnace component surface using a stud welding system manufactured by TRW Nelson Stud Welding Division. A Nelson Series 5000 Model 201 with a hand held gun was used at the weld settings in Table 4.

TABLE 4

| Weld Time | 0.325 seconds |
|---|---|
| Weld Current | 500 Amps |
| Arc Length (Lift) | ⅙ inch |
| Plunge (Burn Off Allowance) | ⅛ inch |

Ceramic ferrules were used to contain the molten metal.

Figure 8:
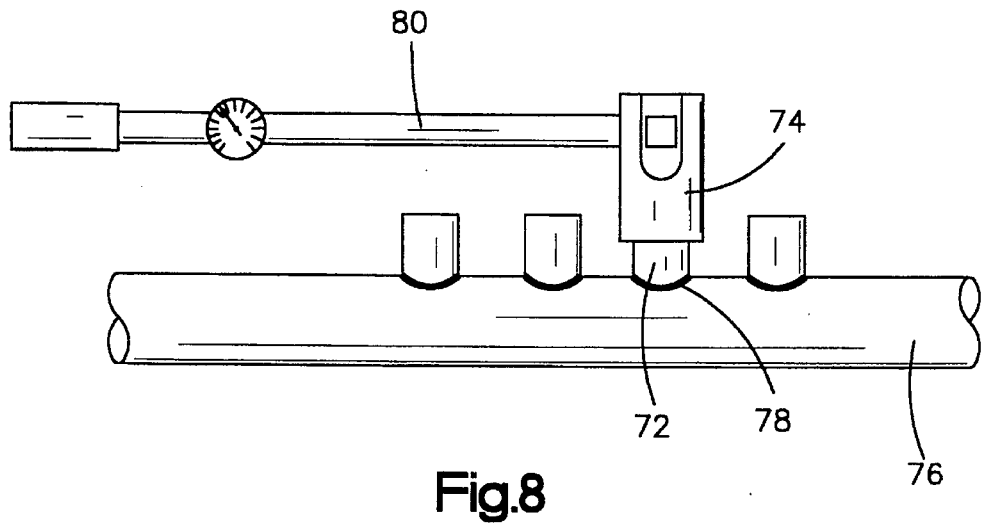
FIG. 8 is a schematic diagram illustrating a torque method of testing the weld strength of studs welded to a furnace component.

The resulting welds were tested for weld strength using the industry standard bend-torque method illustrated in FIG. 8. Using this method, a test fixture 74 is installed onto the welded stud 72. The stud 72 is welded to furnace component 76 at weld 78. A torque wrench 80 is then attached to a ½ inch square hole in the test fixture 74. A bending force is applied to the stud 72 and the torque wrench 80 is used to measure the force needed to cause failure of the weld 78. The weld strength is measured in foot pounds. The industry acceptance standard is 25 ft. lbs. weld strength for a ⅜ inch diameter stainless steel stud and 30 ft. lbs. for mild steel alloy studs.

Results of the bend test are shown as weld strength in ft. lbs. in the following Table 5.

As shown in Table 5, the iron aluminum alloys of the present invention all exhibited weld strengths having a range exceeding the 30 ft. lbs. acceptable for mild steel alloys. Thus, all of the iron aluminum alloys of the present invention exhibited weld strength in excess of commercial acceptance standards.

The studs made from the iron aluminum alloys of the present invention and the alloys of the prior art were also subjected to an oxidation resistance test at an elevated temperature. Good oxidation resistance is an important property for a stud used for furnace components. The lifetime of a stud is directly proportional to its resistance to oxidation. The less oxidation occurring on the surface of a stud, the longer the lifetime of the stud will be.

Oxidation resistance was measured using the following procedure: A cylindrical specimen 0.6 inch in length and 0.3 inch in diameter is weighed. The specimen is then heated in a furnace, in an air atmosphere, to a temperature of 2,000° F. for 100 hours. At the end of the oxidation period, the specimen is cooled to room temperature and the surface is wire brushed to remove all of the oxides. The specimen is then reweighed. The oxidation is expressed as the percentage of mass loss per unit area.

Figure 9:
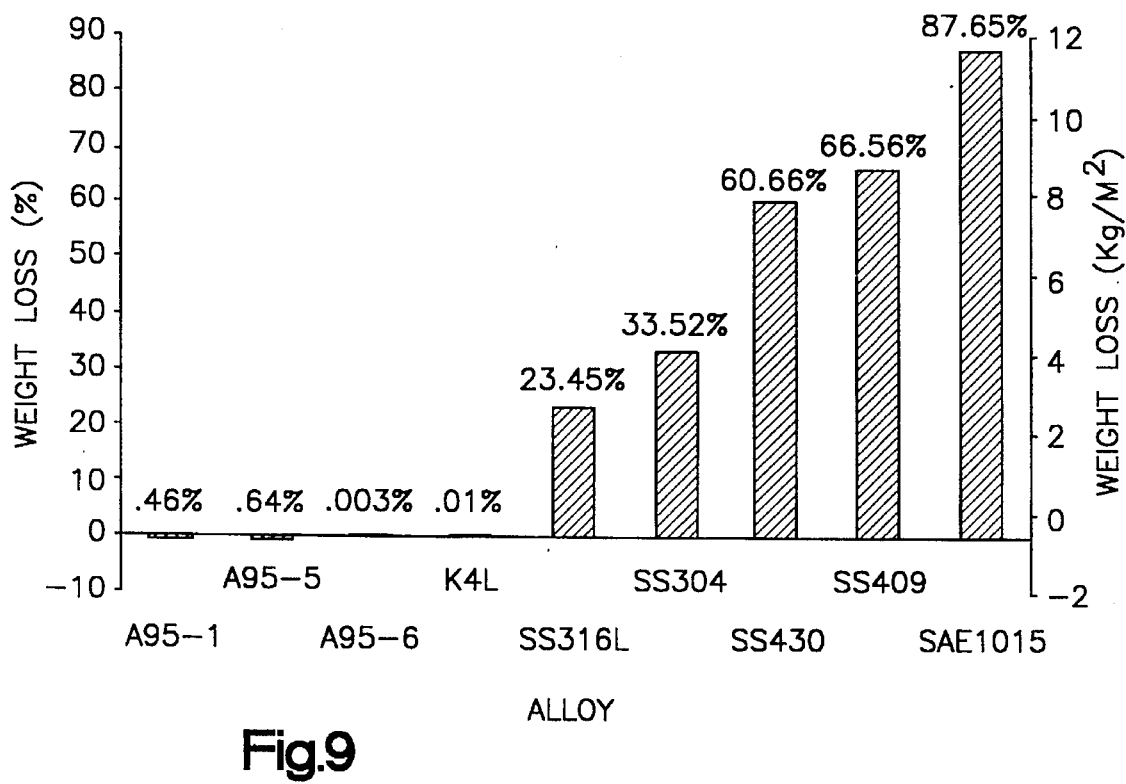
FIG. 9 is a graph comparing the oxidation resistance of studs having an iron aluminum alloy composition in accordance with the present invention compared to the oxidation resistance of studs having a composition according to the prior art.

The results of the oxidation tests are given in FIG. 9. As can be seen in FIG. 9, the prior art alloys of Table 2 showed weight losses ranging from between 23.45% to as high as 87.65% in the oxidation test. In contrast, the iron aluminum alloys of the present invention shown in Table 1 provided dramatic improvements showing virtually no weight loss due to oxidation.

The iron aluminum specimens of the present invention were also subjected to tensile strength tests, and yield strength tests. Tensile strength is an important property for studs and refractory anchors. The greater the tensile strength, the better the compensation will be for lost metal due to corrosion and erosion and the longer the lifetime of the stud. The same is true for yield strength. Tensile strength and yield strength testing were performed according to ASTM specification E-8. All specimens were measured at 0.25 inches in diameter and had a gauge length of 0.5 inches.

Iron aluminum alloy specimens were also measured for percent elongation and percent area reduction (RA), also using ASTM specification E-8. For the prior art metals of Table 2, data relating to tensile strength, yield strength, percent elongation, and area reduction were obtained from the ASTM Metals Handbook.

The results of the tensile tests, the yield strength tests, and the elongation and measurements are given in the following Table 5.

TABLE 5

| | ALLOYS | | | | | | | | |
|---|---|---|---|---|---|---|---|---|---|
| | A95-1 | A95-5 | A95-6 | K4L | SS 316L | SS 304 | SS 430 | SS 409 | SAE 1015 |
| Weld Strength (ft. lbs) | 40–45 | 20–40 | 40–55 | 35–45 | >30 | >30 | >30 | >30 | >30 |
| UTS (Ksi) | 132 | 108 | 98 | 103 | 70 | 75 | 60 | 65 | 55 |
| YS (0.2%, Ksi) | 124 | 88 | 75 | 85 | 25 | 30 | 30 | 35 | 50 |
| ELON (%) | 4.7 | 9.4 | 21.9 | 5.6 | 40 | 40 | 20 | 25 | 27 |
| RA (%) | 6.3 | 11.8 | 21.7 | 8.4 | 50 | 50 | 45 | | |

All of the iron aluminum alloys of the present invention exhibited superior tensile strength in comparison to the alloys of Table 2. As can be seen, the tensile strength for the iron aluminum alloys of the present invention were in the range from 98 to 132 Ksi. Thus, the A-95-6 alloy, which had the lowest ultimate tensile strength of the iron aluminum alloys tested, had a tensile strength nearly 33% greater than the SS304 steel which had the highest tensile strength of the alloys of Table 2.

Also, as can be seen in Table 5, the iron aluminum alloys of the present invention exhibited superior yield strength (YS) in comparison to the alloys of Table 2. The range of the yield strength of the alloys of Table 2 is between 25 Ksi and 50 Ksi. The lowest yield strength of the iron aluminum alloys tested was 75 Ksi, thus exhibiting a 50% greater yield strength than the highest yield strength of the alloys of Table 2.

The results which were obtained with respect to percent elongation and area reduction, in Table 5, are sufficient to allow the use of normal manufacturing methods of forming the alloys into stud refractory anchors and furnace components.

From the above description of the invention, those skilled in the art will perceive improvements, changes and modifications. Such improvements, changes and modifications within the skill of the art are intended to be covered by the appended claims.

Having described the invention, the following is claimed:

1. A stud for welding onto a surface exposed to high temperature, said stud comprising an iron aluminum alloy composition including:

about 8 to 13 wt % aluminum;

about 0.01 to about 0.3 wt % carbon;

said stud having a stud configuration.

2. The stud of claim 1 comprising about 0.5 to about 3 wt % of a refractory metal, and about 0.2 to about 1.5 wt % zirconium.

3. The stud of claim 2 wherein said refractory metal is selected from the group consisting of titanium, molybdenum, vanadium, niobium, tungsten and tantalum.

4. The stud of claim 3 wherein said iron aluminum alloy composition comprises 0 to 1% chromium.

5. The stud of claim 1 having approximately zero weight percent loss after being heated in air at 2,000° F. for 100 hours.

6. The stud of claim 1 having an end configuration suitable for stud welding to a steel or stainless steel base material and having an aluminum content effective to flux the weld and obtain weld zones essentially free of voids without the use of added flux.

7. The stud of claim 1 made by forming the stud from a bar, core, wire or strip stock, said forming including one or more machine steps selected from the group consisting of shearing, cold heading, extrusion, machining and bending.

8. A method of studding a new furnace component surface or restudding an existing furnace component surface comprising the step of welding to said surface a plurality of studs of claim 1, said welding being by (a) stud welding, (b) manual welding, or (c) resistance welding.

9. The method of claim 8 further comprising the step of applying refractory material to said surface, wherein said studs function as refractory anchors and have a refractory anchor configuration.

10. The method of claim 8 wherein said iron aluminum alloy composition comprises 0 to 1% chromium.

11. The method of claim 8 wherein said welding is by arc stud welding and said arc stud welds have a bend torque value of at least about 30 ft. lbs. as determined by the bend torque method.

12. A method of studding a furnace component surface comprising the steps of:

(a) providing a plurality of studs having an iron aluminum alloy composition comprising about 8% to 13% aluminum and about 0.01% to about 0.3% carbon;

(b) welding said studs to said surface, said welding being by arc welding or resistance welding.

13. The method of claim 12 wherein said iron aluminum alloy composition comprises up to about 1% chromium, up to about 3% refractory metal, and/or up to about 1.5% zirconium.

14. A stud for welding to a heat exchange surface having a stud configuration and an iron aluminum alloy composition comprising about 81% to 91% iron, about 8% to 13% aluminum, about 0.01% to 0.3% carbon, and zero to about 3% of a refractory metal and/or zero to about 1.5% zirconium.

15. A stud for welding onto a surface exposed to high temperature having an iron aluminum composition comprising:

(a) about 81% to 91% iron;

(b) about 8% to 13% aluminum;

(c) about 0.01% to 0.3% carbon;

(d) zero to about 3% of a refractory metal selected from the group consisting of titanium, molybdenum, vanadium, niobium, tungsten and tantalum;

(e) zero to about 1.5% zirconium; and (f) zero to about 1% chromium;

said stud having an end configuration suitable for stud welding to a steel or stainless steel surface wherein said end configuration is formed at least in part by the machine steps of shearing and cold heading;

said stud having approximately zero weight percent loss after being heated in air at 2,000° F. for 100 hours.

16. A furnace component comprising:

(a) a furnace component surface; and (b) the stud of claim 15 welded to said surface.

17. A furnace component comprising:

(a) a furnace component surface;

(b) a refractory material on said surface; and (c) a stud of claim 15 welded to said furnace component surface and embedded at least in part in said refractory material, said stud having a refractory anchor configuration.

18. The furnace component according to claim 17 wherein said stud comprises a shank member and a clip member, said shank member comprising at least one notch and said clip member being engaged by said notch, said shank member penetrating the refractory material at about right angles to the plane of the refractory material and said clip member being essentially in the plane of the refractory material.

19. The furnace component according to claim 18 wherein said clip member is at the exposed surface of said refractory material.

20. A furnace component comprising:

(a) a surface of said component resistant to furnace operating conditions;

(b) a plurality of studs welded to said surface in a predetermined pattern;

(c) said studs being welded to said surface by arc welding, stud welding, or resistance welding;

(d) said studs having an iron aluminum alloy composition comprising about 8% to about 13% aluminum and about 0.01% to about 0.3% carbon.

21. The furnace component of claim 20 wherein said iron aluminum alloy composition comprises 0 to 1% chromium and up to about 3% refractory metal and/or about 1.5% zirconium.

22. The furnace component of claim 20 wherein said studs have approximately zero weight percent loss after being heated in air at 2,000° F. for 100 hours.

23. The furnace component of claim 22 wherein said studs are welded by arc stud welding and said arc stud welds have a bend torque value of at least 30 ft. lbs. as determined by the bend torque method.

24. A boiler comprising the furnace component of claim 20, said surface being a heat exchange surface free of refractory material.

25. A furnace comprising the furnace component of claim 20 further comprising refractory material on said furnace component surface, said studs functioning as refractory anchors and having a refractory anchor configuration.

26. The furnace component of claim 21 wherein said refractory metal is selected from the group consisting of titanium, molybdenum, vanadium, niobium, tungsten and tantalum.

27. The furnace component of claim 20 wherein said studs are made by forming the stud from a bar or coil stock having said iron aluminum alloy composition, said forming comprising one or more machine steps selected from the group consisting of shearing, cold heading, extrusion, machining, and bending.

28. The stud of claim 1 having an electrical resistivity effective for arc or resistance welding.

29. A boiler comprising:

a boiler tube;

at least one stud welded to said boiler tube by stud welding;

said stud comprising an iron aluminum alloy composition comprising about 8 to about 13 wt. % aluminum; and about 0.01 to about 0.03 wt. % carbon.

\* \* \* \* \*